US011021075B2

(12) United States Patent
Wood et al.

(10) Patent No.: US 11,021,075 B2
(45) Date of Patent: *Jun. 1, 2021

(54) AUTONOMOUS VEHICLE PALETIZATION SYSTEM

(71) Applicant: UATC, LLC, San Francisco, CA (US)

(72) Inventors: Matthew Shaw Wood, Pittsburgh, PA (US); Dirk John VandenBerg, III, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 16/135,760

(22) Filed: Sep. 19, 2018

(65) Prior Publication Data
US 2019/0033880 A1 Jan. 31, 2019

Related U.S. Application Data

(63) Continuation of application No. 15/475,755, filed on Mar. 31, 2017, now Pat. No. 10,095,239.

(51) Int. Cl.
*B60L 53/80* (2019.01)
*G07C 5/00* (2006.01)
*B60S 5/00* (2006.01)
*B60S 5/02* (2006.01)
*G06Q 10/04* (2012.01)
*G06Q 10/00* (2012.01)
(Continued)

(52) U.S. Cl.
CPC .............. *B60L 53/80* (2019.02); *B60S 5/00* (2013.01); *B60S 5/02* (2013.01); *G01C 21/362* (2013.01); *G06Q 10/047* (2013.01); *G06Q 10/20* (2013.01); *G06Q 50/30* (2013.01); *G07C 5/006* (2013.01); *G07C 5/008* (2013.01)

(58) Field of Classification Search
CPC .. G05D 1/0276; G05D 1/0088; G05D 1/0225; B60S 5/00; G01C 21/362; G07C 5/006; G07C 5/008
See application file for complete search history.

(56) References Cited

U.S. PATENT DOCUMENTS 9,909,889 B2 * 3/2018 Hall .................... G01C 21/3469
10,095,239 B1 * 10/2018 Wood ..................... G07C 5/006
(Continued)

*Primary Examiner* — Hussein Elchanti
(74) *Attorney, Agent, or Firm* — Dority & Manning, P.A.

(57) ABSTRACT

Systems and methods for automatically servicing autonomous vehicles are provided. In one example embodiment, a computer implemented method includes obtaining data associated with one or more reference mechanisms located on an autonomous vehicle. The method includes identifying information associated with the autonomous vehicle based at least in part on the data associated with the one or more reference mechanisms located on the autonomous vehicle. The information associated with the autonomous vehicle includes an orientation of the autonomous vehicle. The method includes determining a vehicle maintenance plan for the autonomous vehicle based at least in part on the information associated with the autonomous vehicle. The method includes providing one or more control signals to implement the vehicle maintenance plan for the autonomous vehicle based at least in part on the orientation of the autonomous vehicle.

20 Claims, 6 Drawing Sheets

(51) Int. Cl.
*G06Q 50/30* (2012.01)
*G01C 21/36* (2006.01)

(56) References Cited

U.S. PATENT DOCUMENTS

| | | | |
|---|---|---|---|
| 2007/0113921 A1* | 5/2007 | Capizzo | B60L 53/80 |
| | | | 141/231 |
| 2015/0142244 A1 | 5/2015 | You et al. | |
| 2015/0339928 A1 | 11/2015 | Ramanujam | |
| 2015/0348335 A1 | 12/2015 | Ramanujam | |
| 2017/0131722 A1* | 5/2017 | Hiramatsu | A01D 75/185 |
| 2017/0287335 A1* | 10/2017 | Ansari | G08G 1/167 |
| 2017/0327091 A1* | 11/2017 | Capizzo | B60L 53/14 |
| 2017/0364869 A1* | 12/2017 | Tarte | G06Q 10/1095 |
| 2017/0365030 A1* | 12/2017 | Shoham | G06Q 10/02 |
| 2018/0041053 A1* | 2/2018 | Capizzo | H02J 7/0027 |

\* cited by examiner

| Vehicle ID | Maintenance History 404 | Scheduled Maintenance 406 | Detected Fault(s) 408 |
|---|---|---|---|
| 402<br>LCLUOP1034 | 1.1.17 – TIRE ROTATION<br>2.1.17 – BRAKE FLUID<br>3.1.17 – FILTER CHANGE<br>... | • CLEANING<br>• OIL CHANGE<br>• BATTERY HOTSWAP<br>... | - LOW ON-BOARD MEMORY AVAILABILITY<br>... |
| ... | ... | ... | ... |

AUTONOMOUS VEHICLE PALETIZATION SYSTEM

PRIORITY CLAIM

The present application is a continuation of U.S. application Ser. No. 15/475,755 having a filing date of Mar. 31, 2017. Applicant claims priority to and benefit of this application and incorporates this application herein by reference.

FIELD

The present disclosure relates generally to automatically providing customized maintenance to an autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment. Given its computational requirements and hardware, an autonomous vehicle may need to receive maintenance for a variety of reasons (e.g., to service its sensors).

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of automatically servicing autonomous vehicles. The method includes obtaining, by one or more computing devices, data associated with one or more reference mechanisms located on an autonomous vehicle. The method includes identifying, by one or more computing devices, information associated with the autonomous vehicle based at least in part on the data associated with the one or more reference mechanisms located on the autonomous vehicle. The information associated with the autonomous vehicle includes an orientation of the autonomous vehicle. The method includes determining, by the one or more computing devices, a vehicle maintenance plan for the autonomous vehicle based at least in part on the information associated with the autonomous vehicle. The method includes providing, by the one or more computing devices, one or more control signals to implement the vehicle maintenance plan for the autonomous vehicle based at least in part on the orientation of the autonomous vehicle.

Another example aspect of the present disclosure is directed to a computing system for automated servicing of autonomous vehicles. The computing system includes one or more sensors configured to scan one or more reference mechanisms located on an autonomous vehicle, one or more processors, and one or more tangible, non-transitory, computer readable media that collectively store instructions that when executed by the one or more processors cause the computing system to perform operations. The operations include identifying information associated with the autonomous vehicle based at least in part on data associated with the one or more reference mechanisms located on the autonomous vehicle. The information includes an orientation of the autonomous vehicle. The operations include determining a vehicle maintenance plan for the autonomous vehicle based at least in part on the information associated with the autonomous vehicle. The operations include providing one or more control signals to implement the vehicle maintenance plan for the autonomous vehicle based at least in part on the orientation of the autonomous vehicle.

Yet another example aspect of the present disclosure is directed to one or more tangible, non-transitory computer-readable media storing computer-readable instructions that when executed by one or more processors cause the one or more processors to perform operations. The operations include obtaining data associated with one or more reference mechanisms located on an autonomous vehicle. The data associated with the one or more reference mechanisms located on the autonomous vehicle is indicative of a position of each of the reference mechanisms relative to the vehicle. The operations include determining an orientation of the autonomous vehicle based at least in part on the data associated with the one or more reference mechanisms. The operations include determining one or more placement locations for servicing equipment associated with a vehicle servicing system based at least in part on the orientation of the autonomous vehicle. The operations include providing one or more control signals to cause the servicing equipment associated with a vehicle servicing system to operate in accordance with the orientation of the autonomous vehicle.

Other example aspects of the present disclosure are directed to systems, methods, vehicles, apparatuses, tangible, non-transitory computer-readable media, and memory devices for automatically servicing autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
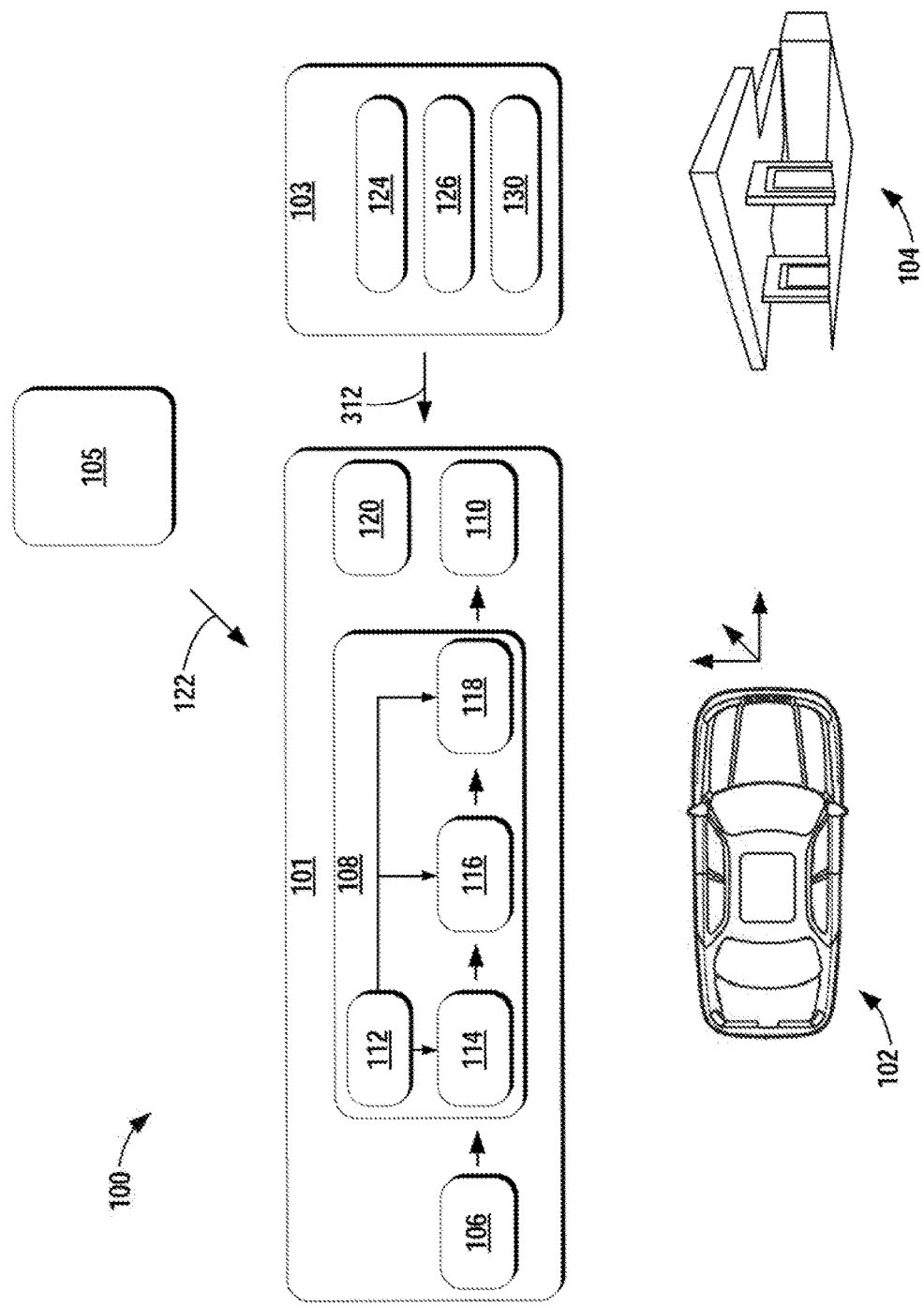
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to automatically servicing an autonomous vehicle for customizable and efficient vehicle maintenance. An autonomous vehicle can drive, navigate, operate, etc. to a service depot to receive maintenance, with minimal and/or no interaction from a human driver. The autonomous vehicle can include one or more reference mechanisms, such as photomarker(s), location marker(s), patterned marker(s), etc. that are located on the vehicle's exterior. For example, the reference mechanisms(s) can serve as targets to implement mechanical orientation for the autonomous vehicle within a service station and/or relative to servicing equipment therein. In some implementations, the reference mechanism(s) can include one or more ultraviolet (UV) and/or infrared (IR) coatings that are invisible to the human eye, but detectable under specialized lighting conditions. A computing system at the service depot can scan the reference mechanism(s) and implement a vehicle maintenance plan that is customized for that specific vehicle. By way of example, the computing system can obtain data associated with the reference mechanism(s) that includes, for instance, the position of a reference mechanism on the vehicle's body. The computing system can identify information associated with the autonomous vehicle such as, for example, the vehicle's orientation based at least in part on the reference mechanism(s) (e.g., the positional data of each reference mechanism). The computing system can determine a customized maintenance plan for the vehicle using such information. For example, the computing system can determine the placement location of servicing equipment (e.g., robotic arms, cleaning devices, etc.) based on the vehicle's orientation. The computing system can send one or more control signals that orient and instruct the servicing equipment to provide customized maintenance to the autonomous vehicle. In this way, the computing system can provide customized maintenance to the autonomous vehicle without the vehicle having to continuously re-orient itself within the servicing depot, leading to more efficient vehicle maintenance as well as decreased vehicle downtime.

More particularly, an autonomous vehicle (e.g., a ground-based vehicle) can be configured to operate in a plurality of operational modes. For example, the autonomous vehicle can be configured to operate in a fully autonomous (e.g., self-driving) manner in which the autonomous vehicle can drive and navigate with minimal and/or no interaction from a human driver present in the vehicle. Additionally, or alternatively, the autonomous vehicle can operate in a semi-autonomous manner in which the vehicle can operate with some interaction from a human driver.

The autonomous vehicle can navigate to a destination, such as a maintenance location (e.g., a service depot), to receive vehicle maintenance. For instance, the autonomous vehicle can determine locally (e.g., on-board the vehicle) that the vehicle should travel to a service depot (e.g., due to a maintenance schedule, detected fault, etc.). In some implementations, a computing device that is remote from the autonomous vehicle can instruct the vehicle to receive maintenance. The maintenance can include providing service to the vehicle in the form of perform daily, periodic, scheduled, routine, repetitive, life-extending, and/or other tasks (e.g., oil change, filter change, etc.) as well as repair of the vehicle (e.g., to fix damage). For example, a remote computing device of a central operations center (e.g., managing a fleet of autonomous vehicles) can send a communication to the autonomous vehicle, instructing the vehicle to travel to a service depot for maintenance.

The service depot can include a computing system configured to coordinate maintenance for the autonomous vehicle. To help determine an optimal vehicle maintenance plan and implementation thereof, the computing system can be configured to scan the vehicle to determine information associated with the specific autonomous vehicle. For example, the autonomous vehicle can include one or a plurality of reference mechanisms from which data associated with the vehicle can be obtained. For example, the reference mechanism(s) can include an RFID tag, low energy signaling device, etc. The reference mechanism(s) can include one or more photomarker(s), location marker(s), patterned marker(s), etc. located on the vehicle's exterior. In some implementations, the reference mechanism(s) can include one or more ultraviolet (UV) and/or infrared (IR) coatings that are invisible to the human eye, but detectable under specialized lighting conditions. The reference mechanism(s) can be included in the paint schema of the autonomous vehicle (e.g., under a vehicle clear coat). The reference mechanism(s) can be placed on various parts of the vehicle including the vehicle roof, vehicle sides, fuel compartment door, etc. In some implementations, one or more of the reference mechanism(s) can be associated with individual components that can be removed, replaced, etc. from the vehicle (e.g., a battery). The computing system can include one or more sensors (e.g., UV sensor, infrared sensor) configured to scan the reference mechanism(s) (e.g., photomarker(s), etc.) located on the vehicle. In some implementations, the autonomous vehicle can include such sensors.

The computing system can obtain data associated with the reference mechanism(s) located on the autonomous vehicle. For instance, a reference mechanism can be indicative of the position of the respective reference mechanism (e.g., x-y-z coordinates, etc.) relative to the vehicle (e.g., relative to a global reference frame). In some implementations, a reference mechanism can be indicative of a vehicle identifier (e.g., vehicle identifier number (VIN), serial number, etc.). The computing system of the service depot can obtain the data associated with reference mechanism(s) via the sensor(s) configured to scan the reference mechanism(s).

The computing system can identify information associated with an autonomous vehicle based at least in part on the data associated with the reference mechanism(s) (e.g., photomarker(s)). For instance, as described herein, the data associated with the reference mechanism(s) can be indicative of a position of each of the reference mechanism(s) relative to the vehicle. The computing system can process such information to determine the orientation of the vehicle. In some implementations, the computing system can process the vehicle identifier associated with the autonomous vehicle to determine a make and/or a model of the autonomous vehicle.

The computing system can determine a customized vehicle maintenance plan for the autonomous vehicle based at least in part on the information associated with the autonomous vehicle. For example, the computing system can determine the vehicle maintenance plan based at least in part on the orientation of the vehicle. As described herein, the reference mechanism(s) can serve as targets to implement mechanical orientation for the autonomous vehicle within a service station and/or relative to servicing equipment therein. The computing system can determine how the servicing equipment (e.g., robotic arms, mechanical cleaning mechanisms, maintenance tools, other mechanical/automated components, etc.) are to be oriented to provide efficient maintenance to the autonomous vehicle. Additionally, or alternatively, the computing system can use the vehicle identifier to search a database that includes maintenance history, scheduled maintenance, preferred maintenance, detected faults, etc. associated with the specific vehicle. Such information can also help the computing system determine which maintenance tasks (e.g., battery change, oil change, data download, etc.) to include in the vehicle maintenance plan. In some implementations, the computing system can determine the vehicle maintenance plan based at least in part on the make and model of the autonomous vehicle. For example, the computing system can use the make and model to determine specific maintenance tasks required for the autonomous vehicle (e.g., tire specifications).

The computing system can send control signal(s) to implement the vehicle maintenance plan for the autonomous vehicle. For example, the service depot can include one or more maintenance stations for servicing an autonomous vehicle. In some implementations, each maintenance station can include servicing equipment for performing one or more maintenance tasks on the autonomous vehicle. In some implementations, each of the maintenance stations can be configured to perform a different maintenance task than the other maintenance stations. For example, the computing system can provide a first control signal to cause the servicing equipment associated with a first maintenance station to perform maintenance on the autonomous vehicle in accordance with at least a first portion of the vehicle maintenance plan. The control signals can instruct the first maintenance station (e.g., a computing device associated therewith) to adjust (e.g., calibrate, configure, etc.) the servicing equipment (e.g., the robotic arms) of the first maintenance station to correspond to the orientation of the autonomous vehicle. Moreover, the control signals can instruct the first maintenance station to perform a maintenance task (e.g., cleaning). Additionally, or alternatively, the computing system can provide a second control signal to cause the servicing equipment of a second maintenance station to perform maintenance on the autonomous vehicle in accordance with at least a second portion of the vehicle maintenance plan. For example, the second control signal can instruct the second maintenance station (e.g., a computing device associated therewith) to adjust (e.g., calibrate, configure, etc.) its servicing equipment to correspond to the orientation of the autonomous vehicle and to perform a second maintenance task (e.g., a battery hot swap, data download from the vehicle's on-board memory). In this way, the servicing equipment can be customized to match the orientation of the autonomous vehicle for efficient performance of the specific maintenance tasks.

The autonomous vehicle can receive maintenance at the service depot in accordance with the determined vehicle maintenance plan. For instance, the autonomous vehicle can autonomously navigate (e.g., without human driver interaction) within the service depot to receive maintenance (e.g., from the appropriate maintenance stations). In some implementations, the computing system can send a control signal to the autonomous vehicle to cause the autonomous vehicle to receive its vehicle maintenance. By way of example, the control signal can indicate the location of each maintenance station to which the vehicle is to travel to receive maintenance. The autonomous vehicle can receive the control signal and implement a motion plan to travel to the location (e.g., of the maintenance station) identified by the control signal. In some implementations, the autonomous vehicle can obtain map data indicative of the layout of the service depot, the location of the maintenance stations, etc. (e.g., before arriving at the service depot). As such, the control signal provided to the vehicle can identify specific maintenance station(s) for the autonomous vehicle and the autonomous vehicle can determine the locations of the station(s) based at least in part on the map data.

The systems and methods described herein provide a number of technical effects and benefits. For instance, the systems and methods allow for customized maintenance of an autonomous vehicle while reducing the computational resources of the vehicle needed to receive such maintenance. In particular, the computing system of the service depot can determine the orientation of the autonomous vehicle as well as specific vehicle maintenance needs and determine a customized maintenance plan that is specific to the autonomous vehicle. Moreover, the computing system can adjust (e.g., calibrate, configure, etc.) its automated servicing equipment based at least in part on the vehicle's orientation to implement the vehicle maintenance plan. In this way, the autonomous vehicle need not adjust its orientation for each specific maintenance task. The systems and methods can allow the autonomous vehicle to receive better, more efficient vehicle maintenance leading to longer vehicle (and vehicle component) life as well as decreased vehicle downtime.

The systems and methods described herein also provide an improvement to vehicle computing technology, such as autonomous vehicle computing technology. For instance, aspects of the present disclosure help the autonomous vehicle to save valuable computational resources. For instance, one or more computing devices can obtain data associated with one or more reference mechanism(s) located on an autonomous vehicle. The computing device(s) can identify information associated with an autonomous vehicle based at least in part on the data associated with the one or more reference mechanisms located on the autonomous vehicle. The computing device(s) can determine a vehicle maintenance plan for the autonomous vehicle based at least in part on the information associated with the autonomous vehicle. The computing device(s) can provide one or more control signals to implement the vehicle maintenance plan for the autonomous vehicle. By utilizing the reference mechanisms to help determine the vehicle maintenance plan, the autonomous vehicle can limit the amount of on-board data storage used for tracking vehicle maintenance requirements, etc. Moreover, because the servicing equipment of the service depot can be adjusted to correspond to the specific vehicle, the autonomous vehicle can avoid using on-board processing resources to re-orient the vehicle for each specific vehicle task. Accordingly, the systems and methods allow the autonomous vehicle to save valuable computational resources that can be allocated to more critical operations of the autonomous vehicle (e.g., object perception, object motion prediction, motion planning, etc.).

In addition, the system and methods described herein provide the technical effect and benefit of improved alignment of autonomous vehicles with respect to a service depot. For instance, the reference mechanism(s) described herein can be provided in addition, or as an alternative, to purely mechanical alignment features which can sometimes be cumbersome, more reliant on human oversight, and not as easy to adapt across different vehicle types. The systems and methods of the present disclosure can result in highly accurate positioning of an autonomous vehicle within service locations in order to properly implement service options. The systems and methods provide a more customizable (per vehicle) approach to maintenance that is more tolerant to different vehicle types and/or other changes. Moreover, the systems and methods provide a more dynamic, computationally efficient approach to autonomous vehicle maintenance than that employed by mechanical paletization, which can include features for mechanically re-positioning the vehicle within the service depot.

With reference now to the FIGS., example embodiments of the present disclosure will be discussed in further detail. FIG. 1 depicts an example system 100 according to example embodiments of the present disclosure. The system 100 can include a vehicle computing system 101 associated with a vehicle 102 and a vehicle servicing computing system 103 that is associated with a service depot 104. In some implementations, the system 100 can include an operations computing system 105 that is remote from the vehicle 102.

The vehicle 102 incorporating the vehicle computing system 101 can be a ground-based autonomous vehicle (e.g., car, truck, bus), an air-based autonomous vehicle (e.g., airplane, drone, helicopter, or other aircraft), or other types of vehicles (e.g., watercraft). The vehicle 102 can be an autonomous vehicle that can drive, navigate, operate, etc. with minimal and/or no interaction from a human driver. For example, the vehicle 102 can operate semi-autonomously with some interaction from a human driver present in the vehicle 102. The vehicle 102 can be configured to operate in a fully autonomous manner (e.g., self-driving manner) such that the vehicle 102 can drive, navigate, operate, etc. with no interaction from a human driver. In some implementations, the vehicle 102 can operate in one or more other operation modes. For instance, in some implementations, the vehicle 102 can operate in a manual mode to allow a human driver full control to drive, navigate, operate, etc. the vehicle 102. Additionally, or alternatively, the vehicle 102 can enter into a service mode in which the vehicle 102 can receive control signals that instruct the vehicle 102 in a particular manner (e.g., to assist with the performance of vehicle maintenance).

As shown in FIG. 1, the vehicle 102 can include one or more data acquisition systems 106, an autonomy computing system 108, and one or more vehicle control systems 110. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The data acquisition system(s) 106 can be configured to obtain acquire sensor data associated with one or more objects that are proximate to the vehicle 102 (e.g., within a field of view of one or more of the data acquisition system(s) 106). The data acquisition system(s) 106 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data can include image data, radar data, LIDAR data, and/or other data acquired by the data acquisition system(s) 106. The object(s) can include, for example, pedestrians, vehicles, bicycles, and/or other objects. The object(s) can be located in front of, to the rear of, and/or to the side of the vehicle 102. The sensor data can be indicative of locations associated with the object(s) within the surrounding environment of the vehicle 102 at one or more times. The data acquisition system(s) 106 can provide the sensor data to the autonomy computing system 108.

In addition to the sensor data, the autonomy computing system 108 can retrieve or otherwise obtain map data 112 associated with the surroundings of the vehicle 102. The map data 112 can provide detailed information about the surrounding environment of the vehicle 102. For example, the map data 112 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 102 in comprehending and perceiving its surrounding environment and its relationship thereto.

The autonomy computing system 108 can include a perception system 114, a prediction system 116, a motion planning system 118, and/or other systems that cooperate to perceive the surrounding environment of the vehicle 102 and determine a motion plan for controlling the motion of the vehicle 102 accordingly. For example, the autonomy computing system 108 can receive the sensor data from the data acquisition system(s) 106, attempt to comprehend the surrounding environment by performing various processing techniques on data collected by the data acquisition system(s) 106, and generate an appropriate motion plan through such surrounding environment. The autonomy computing system 108 can control the one or more vehicle control systems 110 to operate the vehicle 102 according to the motion plan.

The autonomy computing system 108 can identify one or more objects that are proximate to the vehicle 102 based at least in part on the sensor data and/or the map data 112. For example, the perception system 114 can obtain state data descriptive of a current state of an object that is proximate to the vehicle 102. The state data for each object can describe, for example, an estimate of the object's: current location (also referred to as position); current speed (also referred to as velocity); current acceleration; current heading; current orientation; size/footprint (e.g., as represented by a bounding polygon); class (e.g., pedestrian class vs. vehicle class vs. bicycle class), and/or other state information. The perception system 114 can provide the state data to the prediction system 116 (e.g., for predicting the movement of an object).

The prediction system 116 can create predicted data associated with each of the respective one or more objects proximate to the vehicle 102. The predicted data can be indicative of one or more predicted future locations of each respective object. The predicted data can be indicative of a predicted path (e.g., predicted trajectory) of at least one object within the surrounding environment of the autonomous vehicle 102. For example, the predicted path (e.g., trajectory) can indicate a path along which the respective object is predicted to travel over time (and/or the speed at which the object is predicted to travel along the predicted path). The prediction system 116 can provide the predicted data associated with the object(s) to the motion planning system 118.

The motion planning system 118 can determine a motion plan for the vehicle 102 based at least in part on the predicted data. The motion plan can include vehicle actions with respect the objects proximate to the vehicle 102 as well as the predicted movements. For instance, the motion planning system 118 can implement an optimization algorithm that considers cost data associated with a vehicle action as well as other cost functions (e.g., based on speed limits, traffic lights, etc.), if any, to determine optimized variables that make up the motion plan. By way of example, the motion planning system 118 can determine that the vehicle 102 can perform a certain action (e.g., pass an object) without increasing the potential risk to the vehicle 102 and/or violating any traffic laws (e.g., speed limits, lane boundaries, signage). The motion plan can include a planned trajectory, speed, acceleration, etc. of the vehicle 102.

The motion planning system 118 can provide the motion plan indicative of the vehicle actions, a planned trajectory, and/or other operating parameters to the vehicle control system(s) 110 to implement the motion plan for the vehicle 102. For instance, the vehicle 102 can include a mobility controller configured to translate the motion plan into instructions. By way of example, the mobility controller can translate a determined motion plan into instructions to adjust the steering of the vehicle 102 "X" degrees, apply a certain magnitude of braking force, etc. The mobility controller can send one or more control signals to the vehicle control components (e.g., braking control component, steering control component) to execute the instructions and implement the motion plan.

The vehicle 102 can include a communications system 120 configured to allow the vehicle computing system 101 (and its computing device(s)) to communicate with other computing devices. The vehicle computing system 101 can use the communications system 120 to communicate with the vehicle servicing computing system 103, the operations computing system 105, and/or one or more other remote computing device(s) over the network(s) (e.g., via one or more wireless signal connections). In some implementations, the communications system 120 can allow communication among one or more of the system(s) on-board the vehicle 102. The communications system 120 can include any suitable components for interfacing with one or more network(s), including for example, transmitters, receivers, ports, controllers, antennas, or other suitable components that can help facilitate communication with one or more remote computing device(s) that are remote from the vehicle 102.

In some implementations, the vehicle 102 can provide one or more vehicle services to one or more users (e.g., passengers, customers). The vehicle service(s) can include transportation services (e.g., rideshare services), courier services, delivery services, and/or other types of services. For instance, the vehicle 102 can operate in an autonomous navigation mode to transport one or more passengers to a destination location (e.g., while providing rideshare services). In some implementations, the vehicle 102 can be associated with an entity (e.g., a service provider, owner, manager). In some implementations, the entity (e.g., a service provider) can be one that provides one or more vehicle service(s) to a plurality of users via a fleet of vehicles that includes, for example, the vehicle 102. In some implementations, the entity can be associated with only vehicle 102 (e.g., a sole owner, manager). In some implementations, the operations computing system 105 can be associated with such an entity.

The vehicle 102 can navigate to a destination, such as the service depot 104, to receive vehicle maintenance. For instance, the vehicle 102 can determine locally (e.g., on-board the vehicle 102) that the vehicle 102 should travel to a service depot 104 (e.g., due to a maintenance schedule, detected fault, etc.). Additionally, or alternatively, a computing device that is remote from the vehicle 102 can instruct the vehicle 102 to receive maintenance. For example, a remote computing device of the operations computing system 105 (e.g., managing a fleet of autonomous vehicles) can send a communication 122 to the vehicle 102 (e.g., the vehicle computing system 101), instructing the vehicle 102 to travel to the service depot 104 for maintenance. In some implementations, the vehicle 102 can determine an appropriate motion plan through its surrounding environment and autonomously navigate to the service depot 104. In some implementations, the vehicle 102 can enter into the service mode upon arrival at the service depot 104.

The service depot 104 can include the vehicle servicing computing system 103 configured to coordinate maintenance for the vehicle 102. The vehicle servicing computing system 103 can include one or more computing devices 124 and one or more sensors 126. The computing device(s) 124 can include various components for performing various operations and functions. For instance, the computing device(s) 124 can include one or more processor(s) and one or more tangible, non-transitory, computer readable media. The one or more one or more tangible, non-transitory, computer readable media can store instructions that when executed by the one or more processor(s) cause the one or more processor(s) (the vehicle servicing computing system 103) to perform operations and functions, such as those for automated servicing of autonomous vehicles, as described herein.

The sensor(s) 126 can include various devices that are configured to acquire data associated with the vehicle 102. For instance, in some implementations, the sensor(s) 126 can include receivers, antennas, etc. for receiving data emitted from one or more device(s) on-board the vehicle 102, as further described herein. In some implementations, the sensor(s) 126 can include devices configured to scan the vehicle 102 to acquire data associated with the vehicle 102. For instance, the sensor(s) 126 can include an optical camera, laser (camera and/or sensor array), UV sensor, infrared sensor, electric eye, and/or other types of sensors and/or scanning technology that are configured to scan the vehicle 102 and obtain data associated with the vehicle 102. The sensor(s) 126 can be calibrated via photogrammetry, triangulation, and/or other techniques.

The computing device(s) 124 can be configured to obtain data associated with the vehicle 102. For instance, the vehicle 102 can include one or a plurality of reference mechanisms from which data associated with the vehicle 102 can be obtained. In some implementations, the reference mechanism(s) can include an RFID tag, low energy signaling device, etc. In some implementations, the reference mechanisms emit data that can be captured by the vehicle servicing computing system 103 (e.g., via sensor(s) 126).

In some implementations, the reference mechanism(s) can include one or more reference mechanism(s) located on the vehicle's exterior. In some implementations, the reference mechanism(s) can include one or more ultraviolet (UV) and/or infrared (IR) coatings and/or other schemes that can be recognized by a sensor (e.g., optical sensor). In some implementations, the reference mechanism(s) can include a rough texture. The reference mechanism(s) can be invisible to the human eye, but detectable under specialized lighting conditions. The reference mechanism(s) can be included in the paint schema of the vehicle 102 (e.g., under a vehicle clear coat). In some implementations, the reference can be visible to the human eye.

The reference mechanism(s) can be indicative of various types of data. In some implementations, the reference mechanism(s) can be encoded with data. For example, the reference mechanism(s) can include a string of one or more characters that can be captured by the sensor(s) 126 to help determine position, orientation, and/or other characteristics associated with the reference mechanism, the vehicle 102, and/or an individual vehicle component. For example, a reference mechanism (e.g., a photomarker, location marker, patterned marker, etc.) can be indicative of an identifier associated with the vehicle 102 (e.g., vehicle identifier number (VIN), serial number, etc.). In some implementations, the reference mechanism(s) can be indicative of a position of the reference mechanism relative to the vehicle 102. For instance, a reference mechanism (e.g., a photomarker) can be indicative of its position (e.g., expressed coordinates) relative to a global reference frame (e.g., an x-y-z reference frame) associated with the vehicle 102. This helps identify where the reference mechanism(s) are located on the vehicle 102 as well as the gross orientation of the vehicle 102 and/or an individual vehicle component (e.g., based at least in part on the locations of a plurality of reference mechanisms). In some implementations, an individual reference mechanism can be indicative of the orientation of the vehicle 102 and/or an individual vehicle component.

Figure 2:
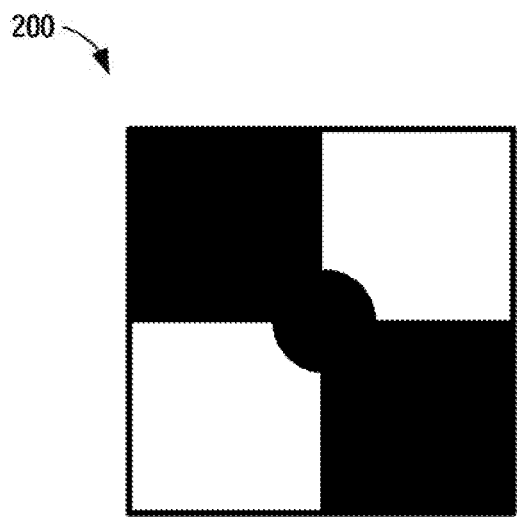
FIG. 2 depicts an example reference mechanism according to example embodiments of the present disclosure.

The reference mechanism(s) can also, or alternatively, include one or more visual characteristics (e.g., detectable by a sensor) that can help determine position and/or orientation. By way of example, FIG. 2 depicts an example reference mechanism 200 according to example embodiments of the present disclosure. The type of reference mechanism 200 shown in FIG. 2 is an example of a reference mechanism that can be observed by a sensor 126 associated with the vehicle servicing computing system 103. Although different graphical designs can be used as well as different coloring options without deviating from the scope of the present disclosure, the black/white design of FIG. 2 provides easily distinguishable contrast. The particular arrangement of adjacent alternating blocks and right angles/edges of reference mechanism can provide a predictable frame of reference for analyzing current alignment and/or orientation of the reference mechanism, the vehicle 102, and/or an individual vehicle component in at least first and second dimensions (e.g., left/right, front/back). In some implementations, the observed location of one or more such reference mechanism(s) can be used to determine the location of the vehicle 102 within the service depot 104 and/or to ultimately determine where the automated servicing equipment needs to maneuver for effectively servicing the vehicle 102, as further described herein.

The reference mechanism(s) can be placed at locations on the vehicle 102 to help generate a model of the vehicle 102. For example, the reference mechanisms can be applied to the vehicle 102 and an offset can be generated to calibrate the vehicle's three-dimensional model to the location(s) of the reference mechanism(s). In some implementations, the precision of placement of the reference mechanism(s) need not necessarily be highly precise. The calibration file associated with the vehicle 102 can be unique for that vehicle. Moreover, the location of the reference mechanism(s) can be oriented with respect to a global reference frame.

Figure 3:
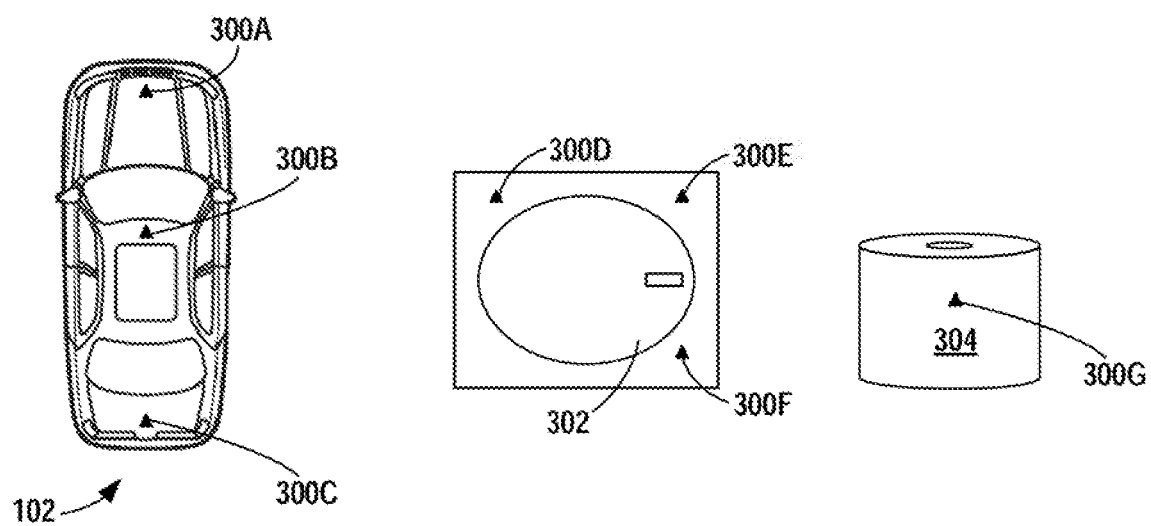
FIG. 3 depicts an example placement of a plurality of reference mechanisms on a vehicle according to example embodiments of the present disclosure.

The reference mechanism(s) can be placed on various parts of the vehicle 102. For example, FIG. 3 depicts example placements of a plurality of reference mechanisms 300A-G according to example embodiments of the present disclosure. The reference mechanisms 300A-G can be reference mechanisms placed on the vehicle 102. As shown in FIG. 3, the reference mechanisms 300A-G can be located on the exterior of the vehicle 102. By way of example, one or more reference mechanisms 300A-C can be located on the hood, roof, trunk, etc. of the vehicle 102. The reference mechanism(s) 300A-C can be scanned by the sensors 126. The reference mechanism(s) 300A-C can be used to help determine a gross orientation of the vehicle 102.

In some implementations, one or more of the reference mechanism(s) 300A-G can be associated with an individual component of the vehicle 102. For example, the reference mechanism(s) 300D-F can be associated with a fuel door 302 of the vehicle 102. The placement and/or orientation of the reference mechanism(s) 300D-F can be indicative of the position and/or the orientation of the individual component (e.g., the location of the fuel door 302, the location of a handle, the location of a hinge, the location of a nozzle hole). This can allow servicing equipment associated with the service depot 104 to be correctly oriented with respect to the vehicle component (e.g., the fuel door 302) for maintenance (e.g., re-fueling), as further described herein.

In some implementations, one or more reference mechanism(s) 300A-G can be located on a component that is to be replaceable, addable to, removable from, etc. the vehicle 102. For example, at least one reference mechanism 300G can be located on a battery 304 of the vehicle 102. The reference mechanism 300G can be indicative of the orientation of the battery 304 while it is installed within the vehicle 102. This can allow servicing equipment associated with the service depot 104 to be correctly oriented with respect to the individual component (e.g., the battery 304) for replacement, repair, etc. The placement of such reference mechanism(s) can also allow the servicing equipment to determine the orientation necessary for placing a new component (e.g., battery) into the vehicle 102.

Returning to FIG. 1, the computing device(s) 124 of the vehicle servicing computing system 103 can obtain data 130 associated with one or a plurality of reference mechanism(s) (e.g., one or more photomarkers) located on the vehicle 102. In some implementations, the data 130 associated with the reference mechanism(s) 300A-G located on the vehicle 102 can be indicative of a position of each of the reference mechanisms relative to the vehicle 102. The data 130 associated with the reference mechanism(s) 300A-G can include the coordinates of one or more of the reference mechanism(s) 300A-G and/or the vehicle 102 derived from the reference mechanism(s).

By way of example, the computing device(s) 124 can obtain the data 130 associated with the reference mechanism(s) 300A-G located on the vehicle 102 via the one or more sensors 126 configured to scan (or otherwise communicate with) the reference mechanism(s) 300A-G. A reference mechanism can, for example, be indicative of the position of the respective reference mechanism (e.g., x-y-z coordinates, etc.) relative to the vehicle (e.g., relative to a global reference frame). The sensor(s) 126 can scan the reference mechanism(s) to acquire the position of each respective reference mechanism relative to the vehicle 102.

The computing device(s) 124 can obtain data indicative of the respective reference mechanism position via the sensor(s) 126.

In another example, a reference mechanism (e.g., a photomarker) can be indicative of an identifier associated with the vehicle 102 (e.g., vehicle identifier number (VIN), serial number, etc.). The sensor(s) 126 can scan (and/or otherwise communicate with) the reference mechanism to acquire the identifier associated with the vehicle 102. The computing device(s) 124 can obtain data indicative of the identifier via the sensor(s) 126.

In some implementations, the computing device(s) 124 can obtain the data 130 associated with the reference mechanism(s) 300A-G via sensors that are located on the vehicle 102. For example, the vehicle 102 can include one or more data acquisition systems 106. As described herein, the data acquisition systems 106 can include one or more sensors. The sensors can be configured to scan (and/or otherwise communicate with) the reference mechanism(s) 300A-G to acquire data associated with reference mechanism(s) (e.g., position of the reference mechanisms, vehicle identifier, etc.). The vehicle 102 can provide the data associated with the reference mechanism(s) 300A-G to the vehicle servicing computing system 103. In this way, the computing device(s) 124 can obtain the data associated with the reference mechanism(s) 300A-G via sensors that are remote from the vehicle servicing computing system 103. In some implementations, the data acquisition system(s) 106 can scan (and/or other communicate with) the reference mechanism(s) to re-calibrate a data acquisition system 106 (e.g., to re-calibrate a sensor after driving over a pothole).

The computing device(s) 124 can be configured to identify information associated with the vehicle 102 based at least in part on the data 130 associated with the reference mechanism(s) 300A-G. For instance, the computing device(s) 124 can determine an orientation of the vehicle 102 based at least in part on the data associated with the plurality of reference mechanisms 300A-G. By way of example, the computing device(s) 124 can identify information associated with the vehicle 102 based at least in part on data associated with one or a plurality of reference mechanisms located on the vehicle 102. The information can include an orientation of the vehicle 102. For instance, as described herein, the data associated with the reference mechanism(s) can be indicative of a position of each of the reference mechanism(s) relative to the vehicle 102. The computing device(s) 124 can process such information to determine the orientation of the vehicle 102. The orientation can be indicative of the vehicle heading, size, shape, positioning, ground clearance, and/or other orienting factors of the vehicle 102 and/or an individual component of the vehicle 102 (e.g., a fuel door, a battery). In another example, the reference mechanisms can be indicative of an identifier associated with the vehicle 102. The computing device(s) 124 can utilize the identifier to determine a make and a model of the vehicle 102 (e.g., via a look-up function in an associated data structure). In some implementations, the computing device(s) 124 can identify the orientation of the vehicle 102 based at least in part on the identifier associated with the vehicle 102 and/or the make/model of the vehicle 102 (e.g., via a look-up function in an associated data structure). In some implementations, the information can include a trim associated with the vehicle 102. The trim can be indicative of the delta between ideal models of the vehicle and the action position of the internal features of the vehicle 102.

Figures 4, 5:
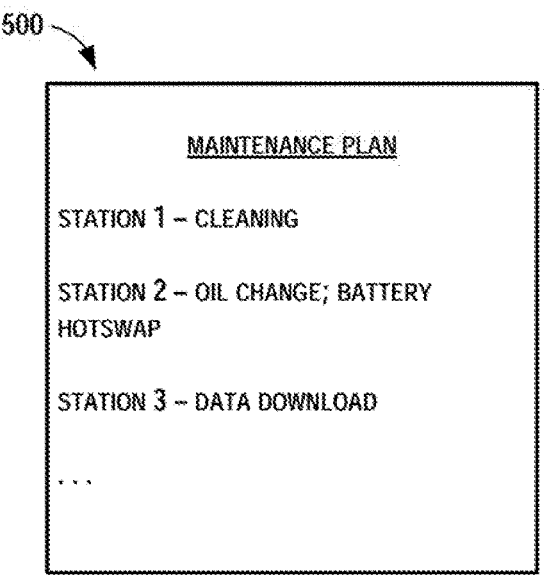
FIG. 4 depicts an example data structure according to example embodiments of the present disclosure.
FIG. 5 depicts an example vehicle maintenance plan according to example embodiments of the present disclosure.

Additionally, or alternatively, the computing device(s) 124 can utilize the identifier associated with the vehicle to determine other information associated with the vehicle 102. FIG. 4 depicts an example data structure 400 (e.g., a table) according to example embodiments of the present disclosure. The data structure 400 can include the identifier 402 associated with the vehicle 102, a maintenance history 404 associated with the vehicle 102, scheduled maintenance 406 associated with the vehicle 102, one or more detected fault(s) 408 associated with the vehicle 102, and/or other information associated with the vehicle 102. The computing device(s) 124 can determine the maintenance history 404 of the vehicle 102 based at least in part on the identifier 402 associated with the vehicle 102. For example, the computing device(s) 124 can look-up the maintenance history 404 (e.g., previous tire rotation, previous brake fluid fill, previous filter change) within data structure 400 based at least in part on the identifier 402. In a similar manner, the computing device(s) 124 can determine the scheduled maintenance 406 (e.g., cleaning, oil change, battery hot swap) and/or the detected fault 408 (e.g., low on-board memory availability) based at least in part on the identifier 402 associated with the vehicle 102.

The computing device(s) 124 can be configured to determine a vehicle maintenance plan for the vehicle 102 based at least in part on the information associated with the vehicle 102. For example, FIG. 5 depicts an example vehicle maintenance plan 500 according to example embodiments of the present disclosure. For example, the computing device(s) 124 can determine the vehicle maintenance plan 500 based at least in part on the orientation of the vehicle 102. As described herein, the computing device(s) 124 can determine the orientation of the vehicle 102 based at least in part on the reference mechanism(s) 300A-G. The reference mechanism(s) 300A-G (e.g., photomarkers) can serve as targets to implement mechanical orientation for the vehicle 102 within a service station and/or relative to servicing equipment therein. The computing device(s) 124 can determine one or more placement locations for servicing equipment (e.g., robotic arms, mechanical cleaning mechanisms, maintenance tools, other mechanical/automated components, etc.) of a vehicle servicing computing system 103 based at least in part on the orientation of the vehicle 102. In this way, the computing device(s) 124 can determine how the servicing equipment is to be oriented to provide efficient maintenance to the vehicle 102 (e.g., given the vehicle's orientation).

Additionally, or alternatively, the computing device(s) 124 can determine the vehicle maintenance plan 500 based at least in part on other information associated with the vehicle 102. For instance, as described herein, the computing device(s) 124 can use the vehicle identifier to identify information associated with the vehicle 102 such as maintenance history, scheduled maintenance, detected faults, etc. associated with the vehicle 102. The computing device(s) 124 can determine one or more maintenance tasks to include in the vehicle maintenance plan 500 based as least in part on such information. By way of example, the computing device(s) 124 can determine that vehicle 102 is to receive a cleaning, re-fueling, a battery hot swap, a data download, and/or other types of maintenance tasks. In some implementations, the vehicle maintenance plan can include filling the cleaning fluid of the vehicle 102. The computing device(s) 124 can determine such tasks based at least in part on the maintenance the vehicle 102 has already received, the maintenance that is scheduled for the vehicle 102, to address the detected fault, etc. In some implementations, the computing device(s) 124 can also determine which service station(s) of the service depot 104 are to perform the maintenance tasks.

Such determination can be made based at least in part on the characteristics of each service station (e.g., the availability of a service station, the type of equipment available at a service station, the capability of the service station).

In some implementations, the computing device(s) 124 can determine the vehicle maintenance plan 500 based at least in part on at least one of the make, the model, or the trim of the vehicle 102. The computing device(s) 124 determines maintenance tasks to include in the vehicle maintenance plan 500 based at least in part on at least one of the make, the model, or the trim of the vehicle 102. For instance, the computing device(s) 124 can use the make and model to determine the tire specifications, type of battery, etc. required for the vehicle 102. The computing device(s) 124 the computing device(s) 124 can use the trim to help determine the actual position of any features that may be obstacles or associated with performing such maintenance task (e.g., to work around, in complement to those features).

The computing device(s) 124 can provide one or more control signals to implement the vehicle maintenance plan 500 for the vehicle 102 based at least in part on the orientation of the vehicle 102. For instance, the computing device(s) 124 can provide one or more control signals to cause the servicing equipment associated with the vehicle servicing computing system 103 to operate in accordance with the orientation of the vehicle 102 (e.g., to cause the servicing equipment to adjust to correspond to the orientation of the vehicle 102). The control signals can provide an approach for the computing device(s) 124 to control the servicing equipment (e.g., a method of robotic system control). The servicing equipment can be configured to perform maintenance on the vehicle 102 in accordance with at least a portion of the vehicle maintenance plan 500.

Figure 6:
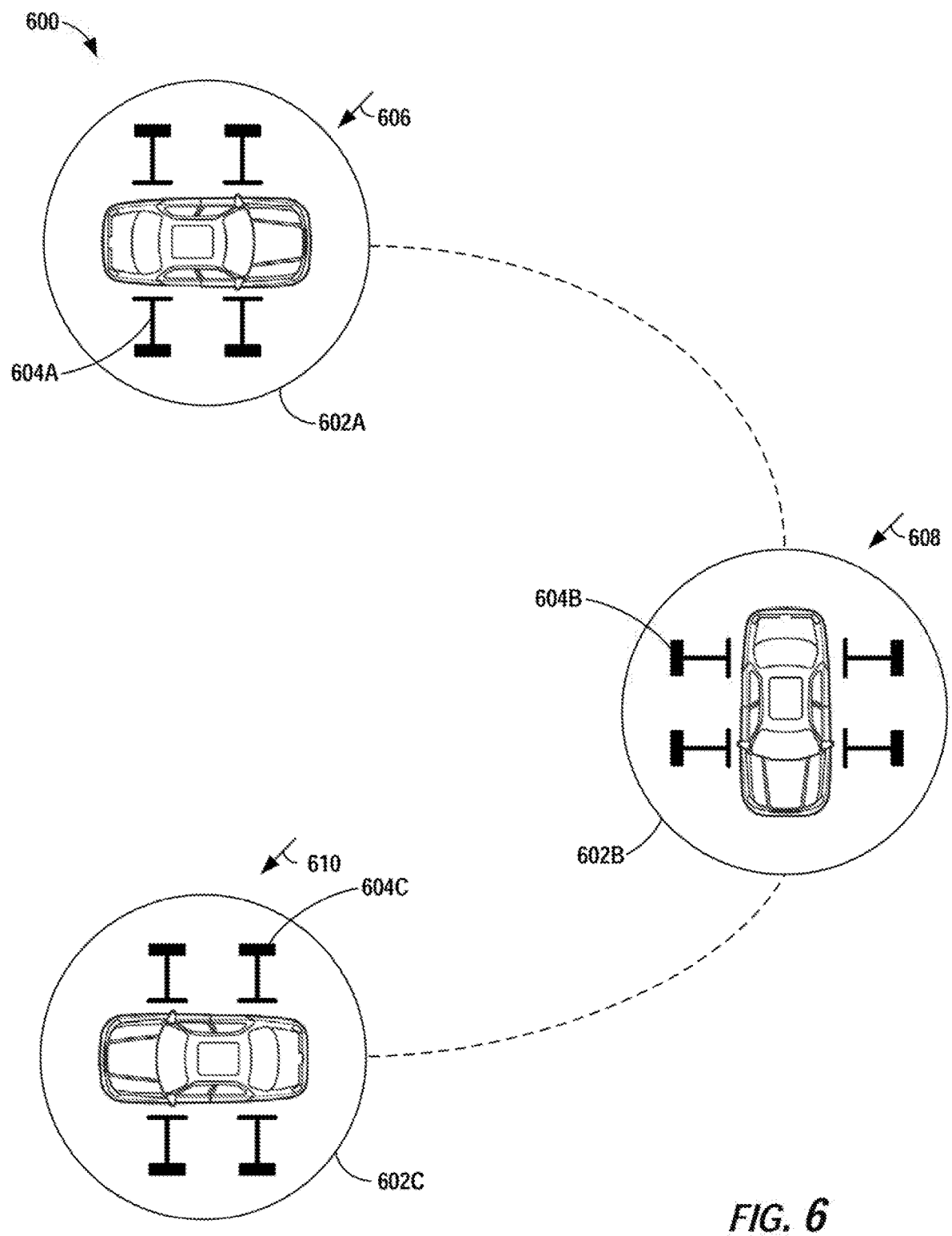
FIG. 6 depicts example maintenance stations according to example embodiments of the present disclosure.

FIG. 6 depicts example maintenance stations 600 according to example embodiments of the present disclosure. A service depot 104 can include one or more maintenance stations 602A-C for servicing a vehicle 102. In some implementations, each maintenance station 602A-C can include servicing equipment 604A-C for performing one or more maintenance tasks on the vehicle 102. In some implementations, each of the maintenance stations 602A-C can be configured to perform one or more different maintenance tasks than the other maintenance stations.

For example, the computing device(s) 124 can provide at least one first control signal 606 to cause the servicing equipment 604A associated with a first maintenance station 602A to correspond to the orientation of the vehicle 102 (e.g., the orientation of the vehicle 102 shown in the first maintenance station 602A of FIG. 6). As described herein, the orientation can be determined based at least in part on the data associated with the reference mechanisms 300A-G (e.g., photomarkers). The servicing equipment 604A associated with the first maintenance station 602A is to perform maintenance on the vehicle 102 in accordance with at least a first portion of the vehicle maintenance plan 500. For example, the at least one first control signal 606 can instruct the first maintenance station 602A (e.g., a computing device associated therewith) to adjust (e.g., calibrate, configure, etc.) the servicing equipment 604A (e.g., robotic arms, other equipment) of the first maintenance station 602A to correspond to the orientation of the vehicle 102. Moreover, the at least one first control signal 606 can instruct the servicing equipment 604A to perform a maintenance task (e.g., cleaning the vehicle 102).

Additionally, or alternatively, the computing device(s) 124 can provide at least one second control signal 608 to cause the servicing equipment 604B associated with a second maintenance station 602B to correspond to the orientation of the vehicle 102. The servicing equipment 604B associated with the second maintenance station 602B is to perform maintenance on the vehicle 102 in accordance with at least a second portion of the vehicle maintenance plan 500. For example, the at least one second control signal 608 can instruct the second maintenance station 602B (e.g., a computing device associated therewith) to adjust the servicing equipment 604B to correspond to the orientation of the vehicle 102 (e.g., as shown in FIG. 6). The at least one second control signal 608 can instruct the servicing equipment to perform one or more second maintenance tasks (e.g., re-fueling, battery hot swap). In this way, the computing device(s) 124 can be configured to coordinate different types of maintenance on the vehicle 102 for different vehicle orientations, if necessary.

In some implementations, the servicing equipment can be configured to perform maintenance on the vehicle 102 in accordance with the orientation of an individual component. In this way, the servicing equipment can be customized to match the orientation of the autonomous vehicle for efficient performance of the specific maintenance tasks. By way of example, the at least one second control signal 608 can be indicative of the orientation of the fuel door 302 that was determined based at least in part on the one or more reference mechanisms 300D-F (e.g., photomarkers). The servicing equipment 604B (and/or a computing device of the second maintenance station 602B) can receive the at least one second control signal 608 and can re-fuel the vehicle 102 based at least in part on the orientation of the fuel door 302. For example, the servicing equipment 604B can be oriented such that the servicing equipment 604B can locate the fuel door 302, properly open the fuel door 302, and properly place a fuel pump nozzle into the vehicle nozzle hole.

In another example, the at least one second control signal 608 can be indicative of the orientation of the battery 304 that was determined based at least in part on the reference mechanism 300G. The servicing equipment 604B (and/or a computing device of the second maintenance station 602B) can receive the at least one second control signal 608 and can replace the battery 304 based at least in part on the orientation of the battery 304. For example, the servicing equipment 604B can be oriented such that the servicing equipment 604B can locate the battery 304, remove the battery 304, and properly place a new battery and/or charged battery in the appropriate orientation within the vehicle 102.

In some implementations, the servicing equipment 604B can be configured to determine (and/or confirm) the orientation of an individual vehicle component. For instance, the servicing equipment 604B can include one or more sensors configured to detect the presence of one or more reference mechanisms associated with the individual component (e.g., fuel door, battery). The servicing equipment 604B can itself determine the orientation of the individual component (e.g., fuel door, battery) with respect to which the servicing equipment 604B is to perform maintenance. Thus, the servicing equipment 604B can perform maintenance on the individual component in accordance with the component orientation as determined by the servicing equipment 604B.

Additionally, or alternatively, the computing device(s) 124 can provide at least one third control signal 60C to cause the servicing equipment 604C associated with a third maintenance station 602C to correspond to the orientation of the vehicle 102. The servicing equipment 604C associated with the third maintenance station 602C is to perform maintenance on the vehicle 102 in accordance with at least a third portion of the vehicle maintenance plan 500. For example, the at least one third control signal 610 can instruct the third maintenance station 602C (e.g., a computing device associated therewith) to adjust the servicing equipment 604C to correspond to the orientation of the vehicle 102 (e.g., as shown in FIG. 6). The at least one third control signal 610 can instruct the servicing equipment to perform one or more third maintenance tasks (e.g., data download from the vehicle 102, cleaning fluid fill).

The vehicle 102 can receive maintenance at the service depot 104 in accordance with the vehicle maintenance plan 500. For instance, the vehicle 102 can autonomously navigate (e.g., without human driver interaction) within the service depot 104 to receive maintenance (e.g., from the appropriate maintenance stations 602A-C). In some implementations, the computing device(s) 124 can send another control signal 312 (e.g., shown in FIG. 1) to the vehicle 102 to cause the vehicle 102 to receive its vehicle maintenance. By way of example, the vehicle 102 can be in a service mode, as described herein. The computing device(s) 124 can provide the control signal 312 to the vehicle 102 to cause the vehicle 102 to autonomously navigate to at least one of the first maintenance station 602A or the second maintenance station 602B or the third maintenance station 602C to receive maintenance in accordance with at least one of the first portion of the vehicle maintenance plan 500 or the second portion of the vehicle maintenance plan 500 or the third portion of the vehicle maintenance plan 500.

In some implementations, the control signal 312 can indicate the location of each maintenance station 602A-C to which the vehicle 102 is to travel to receive maintenance. The vehicle 102 can receive the control signal 312 and implement a motion plan to travel to the location (e.g., of the maintenance station) identified by the control signal 312. In some implementations, the vehicle can obtain map data indicative of the layout of the service depot 104, the location of the maintenance stations, etc. (e.g., before arriving at the service depot 104). As such, the control signal 312 can identify specific maintenance station(s) for the vehicle 102 and the vehicle 102 can determine the locations of the maintenance station(s) 602A-C based at least in part on the map data.

Figure 7:
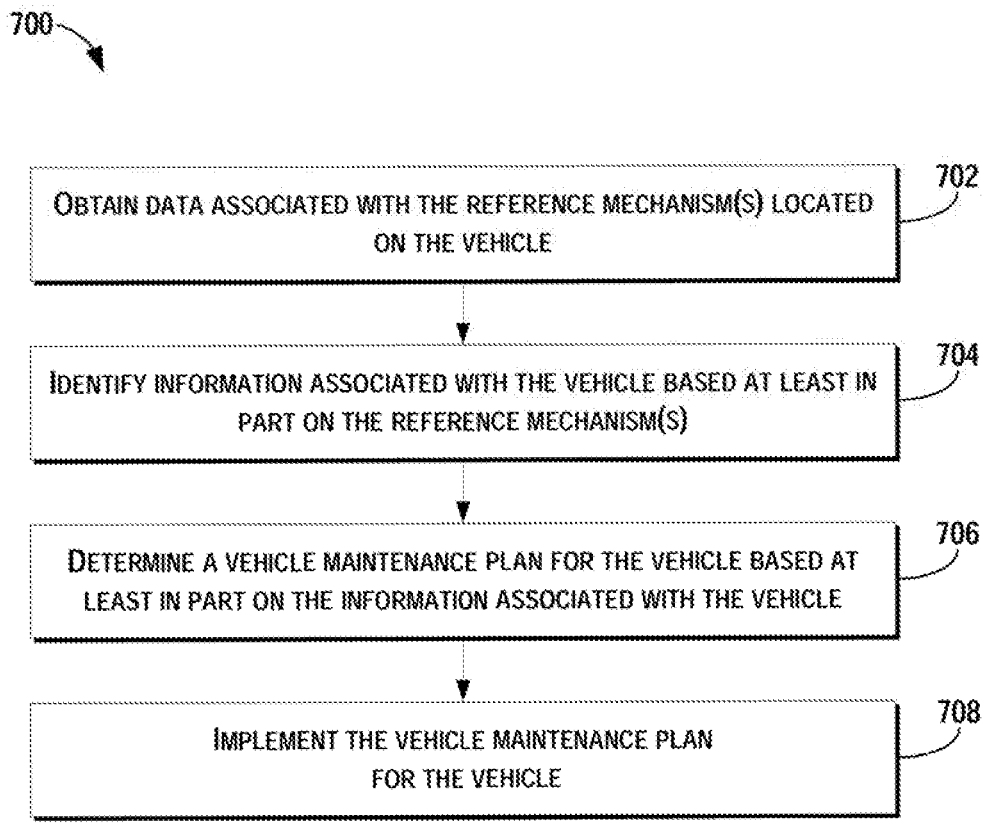
FIG. 7 depicts a flow diagram of an example method of automatically servicing autonomous vehicles according to example embodiments of the present disclosure.

FIG. 7 depicts a flow diagram of an example method 700 of automatically servicing autonomous vehicles according to example embodiments of the present disclosure. One or more portion(s) of the method 700 can be implemented by one or more computing devices such as, for example, the computing device(s) 124 of FIG. 1. Moreover, one or more portion(s) of the method 700 can be implemented as an algorithm on the hardware components of the device(s) described herein (e.g., as in FIGS. 1 and 8) to, for example, automatically service an autonomous vehicle. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (702), the method 700 can include obtaining data associated with one or more reference mechanisms located on the vehicle. For instance, the computing device(s) 124 can obtain data 130 associated with one or more reference mechanisms 300A-G located on a vehicle 102. In some implementations, the reference mechanisms can include one or more reference mechanism(s) that can include at least one of ultraviolet coatings or infrared coatings. The data associated with reference mechanism(s) can be obtained via one or more sensors 126 (e.g., configured to scan the reference mechanism(s)) located at a maintenance location (e.g., service depot 104). The vehicle 102 can travel to the maintenance location in an autonomous navigation mode. In some implementations, the data 130 associated with the one or more reference mechanisms 300A-G located on the vehicle 102 can be indicative of a position of each of the one or more reference mechanisms 300A-G relative to the vehicle 102. In some implementations, the data 130 associated with the one or more reference mechanisms 300A-G located on the vehicle 102 can include an identifier 402 associated with the vehicle 102.

At (704), the method 700 can include identifying information associated with the vehicle based at least in part on the reference mechanism(s). For instance, the computing device(s) 124 can identify information associated with the vehicle based at least in part on the data 130 associated with the one or more reference mechanisms 300A-G located on the vehicle 102. The information associated with the vehicle 102 can include an orientation of the vehicle 102. The orientation of the vehicle 102 can be based at least in part on the position of each of the one or more reference mechanisms 300A-G relative to the vehicle 102. In some implementations, the information associated with the vehicle 102 includes at least one of a make or a model or a trim of the vehicle 102. As described herein, the one or a plurality of reference mechanisms can be associated with an individual component (e.g., a battery) of the vehicle 102. The information associated with the vehicle can be indicative of the orientation of the individual component of the vehicle 102 (e.g., the battery). In some implementations, the computing device(s) 124 can determine a dimension (e.g., height, width) of the vehicle 102 based at least in part on where the reference mechanism(s) are detected in space. The vehicle three-dimensional model can be registered to the height(s) observed by the sensors (e.g., robotic scanner) relative to its coordinate system.

At (706), the method 700 can include determining a vehicle maintenance plan for the vehicle 102. For instance, the computing device(s) 124 can determine a vehicle maintenance plan 500 for the vehicle 102 based at least in part on the information associated with the vehicle 102. As described herein, the vehicle maintenance plan 500 can be based at least in part on the orientation of the vehicle 102. Moreover, the vehicle maintenance plan 500 can include one or more maintenance tasks to be performed (e.g., by servicing equipment). In some implementations, the computing device(s) 124 can determine the vehicle maintenance plan 500 for the vehicle 102 based at least in part on at least one of the make, the model, or the trim of the vehicle 102. In some implementations, one or more of the sensors 126 associated with the vehicle servicing computing system 103 can scan the license plate of the vehicle 102 (and/or registration mark). This can allow the computing device(s) 124 to access a record associated with the vehicle 102, a vehicle maintenance plan, a model, and/or other information.

At (708), the method 700 can include implementing the vehicle maintenance plan for the vehicle. For instance, the computing device(s) 124 can provide one or more control signals to implement the vehicle maintenance plan 500 for the vehicle 102 based at least in part on the orientation of the vehicle 102. The computing device(s) 124 can provide the one or more control signals to adjust servicing equipment associated with a vehicle servicing computing system 103 to correspond to the orientation of the vehicle 102. The servicing equipment can perform maintenance on the vehicle 102 in accordance with at least a portion of the vehicle maintenance plan 500. For example, the vehicle maintenance plan 500 can include re-placing the battery 304 of the vehicle 102. As such, the control signals can cause the servicing equipment to be oriented in a manner to appropriately and efficient hot swap the vehicle battery. In some implementations, the vehicle maintenance plan 500 can include at least one of re-fueling the vehicle 102 or filling cleaning fluid of the vehicle 102.

As described herein, the information associated with the vehicle 102 can include the location of the reference mechanism(s) with respect to a model of the vehicle 102. For example, as described herein, the data associated with one or more reference mechanism(s) can include the position of the reference mechanism(s). Such data can allow for the registration of servicing equipment (e.g., a robotic arm) and a model (e.g., three-dimensional model), to the scanned vehicle's actual position and orientation in space. This can be a relative position referenced to the coordinate system used to command the servicing equipment (e.g., robot).

Figure 8:
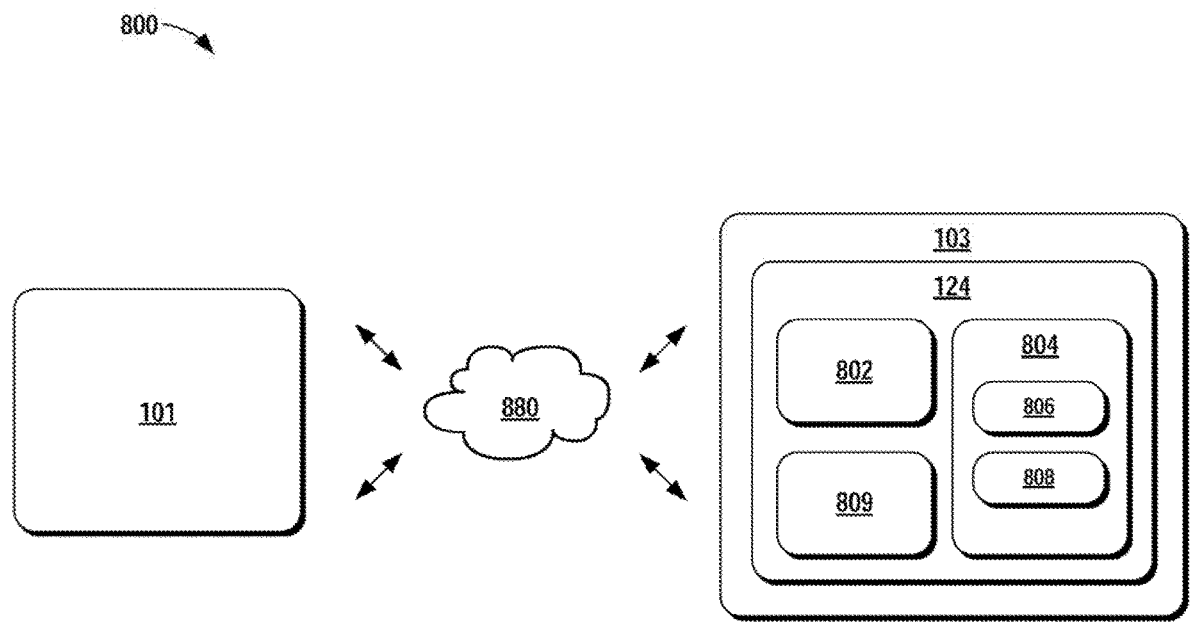
FIG. 8 depicts example system components according to example embodiments of the present disclosure.

FIG. 8 depicts an example computing system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle servicing computing system 103 and a vehicle computing system 101 that can be communicatively coupled to one another over one or more networks 880. In some implementations, the vehicle servicing computing system 103 can be associated with an entity associated with the vehicle 102 such as, for example, a vehicle owner, vehicle manager, fleet operator, service provider, etc.

The computing device(s) 124 of the vehicle servicing computing system 103 can include processor(s) 802 and a memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, etc., and combinations thereof.

The memory 804 can store information that can be accessed by the one or more processors 802. For instance, the memory 804 (e.g., one or more non-transitory computer-readable storage mediums, memory devices) can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 can store instructions 806 that when executed by the one or more processors 802 cause the one or more processors 802 (the computing system 103) to perform operations such as any of the operations and functions of the computing device(s) 124 or for which the computing device(s) 124 are configured, as described herein, any of the operations and functions of the vehicle servicing computing system 103 for which the vehicle servicing computing system 103 is configured, the operations for automatically servicing autonomous vehicles (e.g., one or more portions of method 700), and/or any other functions for automatically servicing autonomous vehicles, as described herein.

The memory 804 can store data 808 that can be obtained, received, accessed, written, manipulated, created, and/or stored. The data 808 can include, for instance, data associated with reference mechanisms, information associated with a vehicle, data structures, maintenance plan data, and/or other data/information as described herein. In some implementations, the computing device(s) 124 can obtain data from one or more memory device(s) that are remote from the vehicle 102.

The computing device(s) 124 can also include a communication interface 809 used to communicate with one or more other system(s) of the vehicle servicing computing system 103 and/or a remote computing device (e.g., vehicle computing system 101). The communication interface 809 can include any circuits, components, software, etc. for communicating with one or more networks (e.g., 880). In some implementations, the communication interface 809 can include for example, one or more of a communications controller, receiver, transceiver, transmitter, port, conductors, software and/or hardware for communicating data.

The network(s) 880 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 880 can be accomplished, for instance, via a communication interface using any type of protocol, protection scheme, encoding, format, packaging, etc.

The vehicle computing system 101 can include one or more computing devices that include components (e.g., processor(s), memory, instructions, data) similar to that described herein for the computing device(s) 124. Moreover, such computing device(s) can be configured to perform one or more operations of the vehicle computing system 101, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for automated vehicle servicing, comprising:
    obtaining, by a computing system comprising one or more computing devices, data associated with one or more reference mechanisms located on a vehicle;
    determining, by the computing system, an orientation of the vehicle based at least in part on the data associated with the one or more reference mechanisms located on the vehicle; and
    providing, by the computing system, one or more control signals to implement a vehicle maintenance plan for the vehicle based at least in part on the orientation of the vehicle, wherein the one or more control signals comprise one or more control signals to cause servicing equipment associated with a vehicle servicing system to perform maintenance for the vehicle or one or more control signals to cause the vehicle to receive maintenance.

2. The computer-implemented method of claim 1, wherein the vehicle is an autonomous vehicle.

3. The computer-implemented method of claim 2, wherein the computing system is associated with a service depot, and wherein the autonomous vehicle is configured to autonomously navigate to a plurality of maintenance stations within the service depot based at least in part on the vehicle maintenance plan.

4. The computer-implemented method of claim 1, wherein the data associated with the one or more reference mechanisms located on the vehicle is indicative of a position of each of the one or more reference mechanisms relative to the vehicle.

5. The computer-implemented method of claim 4, wherein the data associated with the one or more reference mechanisms located on the vehicle is indicative of coordinates for each of the respective reference mechanisms relative to a reference frame associated with the vehicle.

6. The computer-implemented method of claim 4, wherein determining the orientation of the vehicle comprises determining the orientation of the vehicle based at least in part on the position of each of the one or more reference mechanisms relative to the vehicle.

7. The computer-implemented method of claim 1, wherein providing the one or more control signals to implement the vehicle maintenance plan for the vehicle comprises:
    providing, by the computing system, the one or more control signals to cause the servicing equipment associated with the vehicle servicing system to perform maintenance for the vehicle to adjust the servicing equipment associated with the vehicle servicing system to correspond to the orientation of the vehicle.

8. The computer-implemented method of claim 7, wherein the servicing equipment is to perform maintenance on the vehicle in accordance with at least a portion of the vehicle maintenance plan.

9. The computer-implemented method of claim 1, wherein the data associated with the one or more reference mechanisms located on the vehicle further comprises an identifier associated with the vehicle, wherein the identifier is indicative of at least one of a make, a model, or a trim of the vehicle.

10. The computer-implemented method of claim 1, wherein determining the orientation of the vehicle based at least in part on the data associated with the one or more reference mechanisms located on the vehicle comprises:
    generating a three-dimensional model of the vehicle based on the one or more reference mechanisms located on the vehicle.

11. A computing system for automated vehicle servicing, comprising:
    one or more processors; and
    one or more tangible, non-transitory, computer readable media that collectively store instructions that when executed by the one or more processors cause the computing system to perform operations, the operations comprising:
    obtaining, via one or more sensors, data associated with one or more reference mechanisms located on a vehicle;
    determining information associated with the vehicle based at least in part on the data associated with the one or more reference mechanisms located on the vehicle, wherein the information comprises an orientation of the vehicle; and
    providing one or more control signals to initiate maintenance for the vehicle based at least in part on the orientation of the vehicle, wherein the one or more control signals comprise one or more control signals to cause servicing equipment associated with a vehicle servicing system to perform maintenance on the vehicle or one or more control signals to cause the vehicle to receive maintenance.

12. The computing system of claim 11, wherein the one or more reference mechanisms comprise at least one of ultraviolet coatings or infrared coatings.

13. The computing system of claim 11, wherein the one or more control signals to cause the servicing equipment associated with the vehicle servicing system to perform maintenance on the vehicle comprise:
    at least one first control signal to cause equipment associated with a first maintenance station to correspond to the orientation of the vehicle, and wherein the equipment associated with the first maintenance station is configured to perform a first maintenance task on the vehicle.

14. The computing system of claim 13, wherein the one or more control signals to cause the servicing equipment associated with the vehicle servicing system to perform maintenance on the vehicle comprise:
    at least one second control signal to cause equipment associated with a second maintenance station to correspond to the orientation of the vehicle, and wherein the equipment associated with the second maintenance station is configured to perform a second maintenance task on the vehicle.

15. The computing system of claim 14, wherein the one or more control signals to cause the vehicle to receive maintenance comprise:
    another control signal to the vehicle to cause the vehicle to navigate to at least one of the first maintenance station or the second maintenance station.

16. The computing system of claim 11, wherein the vehicle maintenance plan comprises at least one of replacing a battery of the vehicle, re-fueling the vehicle, or filling cleaning fluid of the vehicle.

17. One or more tangible, non-transitory computer-readable media storing computer-readable instructions that when executed by one or more processors cause the one or more processors to perform operations, the operations comprising:
    obtaining data associated with one or more reference mechanisms located on a vehicle, wherein the data associated with the one or more reference mechanisms located on the vehicle is indicative of a position of each of the reference mechanisms relative to the vehicle;

determining an orientation of the vehicle based at least in part on the data associated with the one or more reference mechanisms; and providing one or more control signals to initiate maintenance for the vehicle based at least in part on the orientation of the vehicle, wherein the one or more control signals comprise one or more control signals to cause servicing equipment associated with a vehicle servicing system to perform maintenance on the vehicle or one or more control signals to cause the vehicle to receive maintenance.

18. The one or more tangible, non-transitory computer-readable media of claim 17, wherein the one or more control signals to cause the servicing equipment associated with the vehicle servicing system to perform maintenance on the vehicle comprise:

at least one control signal to cause the servicing equipment to adjust to correspond to the orientation of the vehicle.

19. The one or more tangible, non-transitory computer-readable media of claim 17, wherein obtaining the data associated with the one or more reference mechanisms located on the vehicle comprises:

obtaining the data associated with the one or more reference mechanisms located on the vehicle via one or more sensors configured to scan the one or more reference mechanisms.

20. The one or more tangible, non-transitory computer-readable media of claim 19, wherein the one or more sensors are located on the vehicle.

\* \* \* \* \*